(12) United States Patent
Song et al.

(10) Patent No.: US 11,386,304 B2
(45) Date of Patent: Jul. 12, 2022

(54) ELECTRONIC DEVICE AND METHOD OF CONTROLLING THE SAME

(71) Applicant: SAMSUNG ELECTRONICS CO., LTD., Suwon-si (KR)

(72) Inventors: Heejun Song, Suwon-si (KR); Sejeong Kwon, Suwon-si (KR); Prateek Chaudhry, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 16/545,309

(22) Filed: Aug. 20, 2019

(65) Prior Publication Data
US 2020/0057923 A1 Feb. 20, 2020

(30) Foreign Application Priority Data

Aug. 20, 2018 (KR) .......... 10-2018-0096691
Aug. 14, 2019 (KR) .......... 10-2019-0099895

(51) Int. Cl.
| | |
|---|---|
| *G10L 15/22* | (2006.01) |
| *G06K 9/62* | (2022.01) |
| *G06N 3/08* | (2006.01) |
| *G06F 9/30* | (2018.01) |

(52) U.S. Cl.
CPC ....... *G06K 9/6268* (2013.01); *G06F 9/30003* (2013.01); *G06N 3/08* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,678,794 B1 | 6/2017 | Barrett et al. | |
| 9,754,221 B1 | 9/2017 | Nagaraja | |
| 10,748,546 B2* | 8/2020 | Kim | G10L 17/22 |
| 2013/0254153 A1* | 9/2013 | Marcheret | G06N 20/00 |
| | | | 706/59 |
| 2015/0348551 A1* | 12/2015 | Gruber | G10L 15/26 |
| | | | 704/235 |
| 2016/0357855 A1 | 12/2016 | Fan et al. | |
| 2017/0068513 A1 | 3/2017 | Stasior et al. | |
| 2017/0177715 A1 | 6/2017 | Chang et al. | |
| 2017/0351952 A1 | 12/2017 | Zhang et al. | |

(Continued)

FOREIGN PATENT DOCUMENTS

KR 10-1068122 9/2011

*Primary Examiner* — Seong-Ah A Shin
(74) *Attorney, Agent, or Firm* — Nixon & Vanderhye P.C.

(57) ABSTRACT

An electronic device is provided. The electronic device includes a memory configured to store a computer executable instructions; and a processor configured to execute the executable instructions to: determine a text corresponding to a received command, provide response information on the command based on a first artificial intelligence model classifying the text as a text corresponding to one of a plurality of pre-stored texts, and provide error information on the command based on the first artificial intelligence model classifying the text as an error, wherein the first artificial intelligence model is configured to classify the text as the error based on the text corresponding to the command being a similar text having one of an entity and an intent different from at least one of the plurality of pre-stored texts.

10 Claims, 20 Drawing Sheets

(56) References Cited

U.S. PATENT DOCUMENTS

| | | |
|---|---|---|
| 2018/0018971 A1 | 1/2018 | Park et al. |
| 2018/0083898 A1 | 3/2018 | Pham |
| 2018/0091457 A1 | 3/2018 | Bakis et al. |
| 2018/0182383 A1* | 6/2018 | Kim .................. G10L 15/22 |
| 2018/0329677 A1* | 11/2018 | Gruber ............... G06F 3/0482 |
| 2019/0121532 A1* | 4/2019 | Strader .............. G10L 15/26 |
| 2019/0130903 A1* | 5/2019 | Sriram ............... G10L 15/20 |
| 2019/0260781 A1* | 8/2019 | Fellows .............. G06F 21/36 |
| 2019/0286073 A1* | 9/2019 | Hosseini-Asl ....... G05B 13/027 |
| 2019/0286628 A1* | 9/2019 | Zhou ................. G06F 11/0709 |

* cited by examiner

ELECTRONIC DEVICE AND METHOD OF CONTROLLING THE SAME

CROSS-REFERENCE TO RELATED APPLICATION

This application is based on and claims priority under 35 U.S.C. § 119 to Korean Patent Application No. 10-2018-0096691, filed on Aug. 20, 2018, and Korean Patent Application No. 10-2019-0099895, filed on Aug. 14, 2019, in the Korean Intellectual Property Office, the disclosures of which are incorporated by reference herein in their entireties.

BACKGROUND

Field

The disclosure relates to an electronic device and a method of controlling the same, and for example, to an electronic device operating based on artificial intelligence technology and a method of controlling the same.

Description of Related Art

Recently, artificial intelligence systems have been developed. Unlike conventional rule-based systems, the artificial intelligence systems are systems that machines learn and judge on their own, and are used in various technical fields such as voice recognition, image recognition, and future prediction.

In particular, interactive artificial intelligence systems have recently been developed. The interactive artificial intelligence systems are systems that analyze a request of a user through an artificial intelligence model and provide a response thereto, and are used in a chat bot service and the like.

In general, the interactive artificial intelligence systems store vast amounts of text in a database. In addition, when the interactive artificial intelligence system receives the request of the user, the interactive artificial intelligence system finds a text that best matches the request of the user among the texts stored in the database, and provides response information based on the text.

However, in some cases, the user may enter a request that is similar in form to the text stored in the database, but having a different subject, purpose, or the like.

For example, this is such a case when the text stored in the database is "find a taxi" included in a "traffic" category, and the user inputs "I want to watch a taxi" with an intent of watching a movie taxi.

In this case, if there is no text in the database like "I want to watch a taxi," the conventional interactive artificial intelligence system finds "find a taxi" most similar to "I want to watch a taxi" among the stored texts, and provides information related to the available taxis around the user as response information.

However, this is the response information irrelevant to the intent of the user and causes inconvenience to the user.

SUMMARY

Embodiments of the disclosure address the above disadvantages and other disadvantages not described above.

The disclosure provides an electronic device capable of distinguishing a text that is similar in form to a text previously stored in a database, but having a different subject, purpose, or the like from the text previously stored in the database.

According to an example embodiment of the disclosure, an electronic device includes: a memory configured to store computer executable instructions; and a processor configured to execute the computer executable instructions to: determine a text corresponding to a received command, provide response information on the command based on the text being classified as a text corresponding to one of a plurality of pre-stored texts by a first artificial intelligence model, and provide error information based on the text being classified as an error by the first artificial intelligence model, wherein the first artificial intelligence model is configured to classify the text as the error based on the text corresponding to the command being a similar text having one of an entity and an intent different from at least one of the plurality of pre-stored texts.

The first artificial intelligence model may be a model obtained by learning a model determining the text corresponding to the command based on the plurality of pre-stored texts to classify the similar text as the error.

The similar text may be generated by a second artificial intelligence model.

The first artificial intelligence model may determine whether the similar text input to the first artificial intelligence model corresponds to one of the plurality of pre-stored texts, and determine whether to perform learning based on the determination result.

The first artificial intelligence model may perform the learning to classify the similar text as the error based on determining that the similar text corresponds to one of the plurality of pre-stored texts, and may not perform the learning based on determining that the similar text does not correspond to one of the plurality of pre-stored texts.

The second artificial intelligence model may perform the learning to generate a new similar text having a higher similarity than the similar text to at least one text, based on the first artificial intelligence model determining that the similar text does not correspond to one of the plurality of pre-stored texts.

The first artificial intelligence model may receive the new similar text generated by the second artificial intelligence model, determine whether the new similar text corresponds to one of the plurality of pre-stored texts, and determine whether to perform the learning based on the determination result.

The first and second artificial intelligence models may be generative adversarial networks (GAN).

According to another example embodiment of the disclosure, a method of controlling an electronic device includes: determining a text corresponding to a received command; and providing response information on the command based on the text being classified as a text corresponding to one of a plurality of pre-stored texts by a first artificial intelligence model, and providing error information based on the text being classified as an error by the first artificial intelligence model, wherein the first artificial intelligence model is configured to classify the text as the error based on the text corresponding to the command being a similar text having one of an entity and an intent different from at least one of the plurality of pre-stored texts.

The first artificial intelligence model may be a model obtained by learning a model determining the text corresponding to the command based on the plurality of pre-stored texts to classify the similar text as the error.

The similar text may be generated by a second artificial intelligence model.

The first artificial intelligence model may determine whether the similar text input to the first artificial intelligence model corresponds to one of the plurality of pre-stored texts, and determine whether to perform learning based on the determination result.

The first artificial intelligence model may perform the learning to classify the similar text as the error based on determining that the similar text corresponds to one of the plurality of pre-stored texts, and may not perform the learning based on determining that the similar text does not correspond to one of the plurality of pre-stored texts.

The second artificial intelligence model may perform the learning to generate a new similar text having a higher similarity than the similar text to at least one text, based on the first artificial intelligence model determining that the similar text does not correspond to one of the plurality of pre-stored texts.

The first artificial intelligence model may receive the new similar text generated by the second artificial intelligence model, determine whether the new similar text corresponds to one of the plurality of pre-stored texts, and determine whether to perform the learning based on the determination result.

The first and second artificial intelligence models may be generative adversarial networks (GAN).

According to various example embodiments of the disclosure as described above, it is possible to provide the electronic device capable of distinguishing the text that is similar in form to the text previously stored in the memory, but having a different one of an entity and an intent from the text previously stored in the memory.

Accordingly, it is possible to prevent and/or reduce the case of providing the response information irrelevant to the intent of the user.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms used in the disclosure and claims are generally generic terms in consideration of the functions of the disclosure. However, these terms may vary depending on the intentions of the artisan skilled in the art, legal or technical interpretation, and emergence of new technologies. In addition, some terms may be arbitrarily selected. These terms may be understood as defined herein, and may be interpreted based on the general contents of the disclosure and common technical knowledge in the related art, unless otherwise defined.

When a detailed description for a known function or configuration related to the disclosure may obscure the gist of the disclosure, the detailed description thereof may be abbreviated or omitted.

Hereinafter, various example embodiments of the disclosure will be described in greater detail with reference to the accompanying drawings and the contents described in the accompanying drawings, but the disclosure is not limited to or by the descriptions of the various example embodiments.

Hereinafter, the disclosure will be described in greater detail with reference to the accompanying drawings.

Figure 1A:
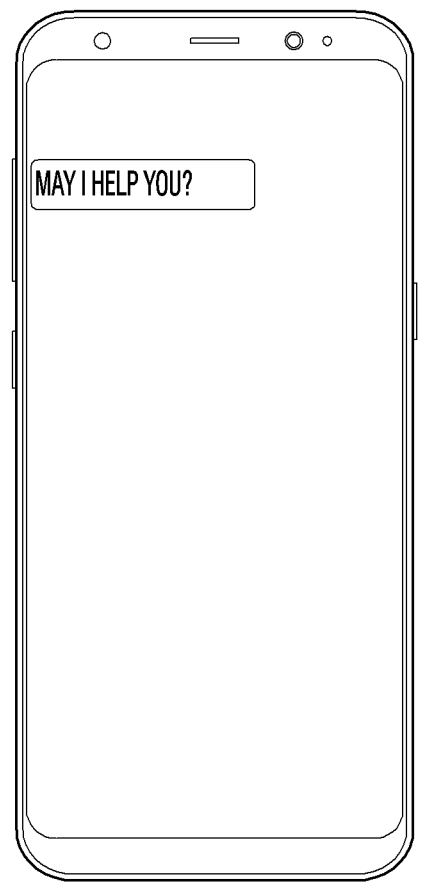
FIGS. 1A, 1B and 1C are diagrams illustrating an example screen provided by an example electronic device according to an embodiment of the disclosure.
Figure 1B:
Figure 1C:
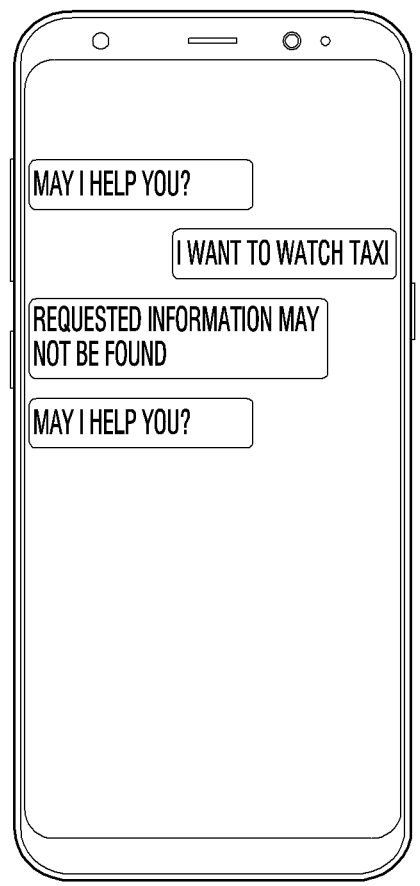

FIGS. 1A, 1B and 1C are diagrams illustrating an example screen provided by an electronic device according to an embodiment of the disclosure.

An electronic device (not shown in FIGS. 1A, 1B and 1C) may be various electronic devices capable of receiving a user command. For example, and without limitation, the electronic device may be a smart phone, a personal computer (PC), a tablet PC, a notebook, a personal digital assistant (PDA), a portable multimedia player (PMP), a smart TV, or the like.

In addition, the electronic device may be a server that receives a command, e.g., a user command, from an external device (not shown). When the electronic device is implemented as the server, the external device may, for example, and without limitation, be a smart phone, a PC, a tablet PC, a notebook, a PDA, a PMP, a smart TV, or the like. Hereinafter, for convenience of description, it will be described under the assumption that the electronic device (although not illustrated in FIGS. 1A, 1B and 1C) according to an embodiment of the disclosure is the server. In the example illustrated in FIGS. 1A, 1B and 1C, the example external device is a smart phone. However, it will be understood that the disclosure is not limited thereto.

The external electronic device may provide a screen for inducing a query of a user. For example, as illustrated in FIG. 1A, the external electronic device may provide a screen including a message such as "May I help you?". For example, the screen may be an execution screen of a specific application.

In addition, the external electronic device may receive a command, e.g., a user command. For example, the user command may be a text input through a keyboard or an on-screen keyboard, or the like, as well as a picture or a text input through a stylus or the like. In addition, the user command may also be user voice input through a microphone. However, it will be understood that the disclosure is not limited thereto.

In addition, when the external electronic device receives the user command, the electronic device may provide response information on the user command.

For example, the electronic device may first classify a category of the user command. For example, when the external electronic device receives the user command, the electronic device may identify a text corresponding to the user command among a plurality of pre-stored texts, and classify the category of the user command based on category information matched to each text. In addition, the electronic device may provide, as the response information, information corresponding to the user command among a plurality of information included in a corresponding category.

For example, in a state in which a text such as 'taxi search' is pre-stored in the electronic device, when "find taxi" is input as illustrated in FIG. 1B, the electronic device may identity 'taxi search' by a text corresponding to "find taxi" among the plurality of pre-stored texts. In addition, the electronic device may classify a 'traffic' category matched to 'taxi search' as a category of the user command, and provide, as the response information, information related to 'taxi search' among a plurality of information included in the "traffic" category. For example, as illustrated in FIG. 1B, the external electronic device may provide, as the response information, information related to a reservable taxi around the user.

When the text corresponding to the received user command is similar in form to the plurality of pre-stored texts, but has a different one of an entity and/or an intent, the electronic device according to an embodiment of the disclosure may classify the category of the corresponding user command as an error.

For example, in the state in which the text such as 'taxi search' is pre-stored in the electronic device as in the embodiment described above, when "I want to watch taxi" is input as illustrated in FIG. 1C, 'taxi search' and "I want to watch taxi" are similar in form in that they include "taxi" in common, but the former is intended to search for information related to a 'traffic' taxi and the latter is intended to search for information related to a 'movie' taxi, that is, the intents are different from each other. In this example, the electronic device may classify a category of the corresponding user command as an error. A more detailed description thereof will be described below.

In addition, when the category of the user command is classified as the error, the electronic device may provide error information. For example, the error information may be information that the information requested by the user command may not be found.

Referring again to FIG. 1C, in a state in which a text such as 'taxi search' is pre-stored in the electronic device, when "I want to watch taxi" is input, the electronic device may classify a category of "I want to watch taxi" as an error and provide information that the requested information may not be found as error information.

Accordingly, unlike the conventional electronic device, the electronic device according to an embodiment of the disclosure may prevent and/or reduce a case of providing the response information irrelevant to the intent of the user.

Figure 2:
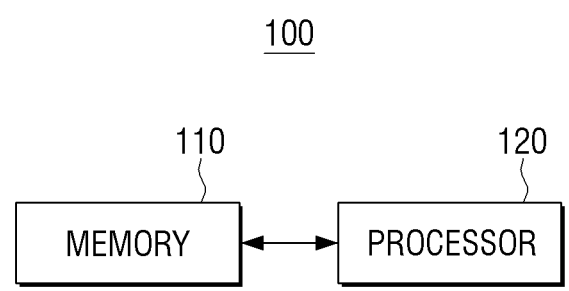
FIG. 2 is a block diagram illustrating an example electronic device according to an embodiment of the disclosure.

FIG. 2 is a block diagram illustrating an example electronic device according to an embodiment of the disclosure. As illustrated in FIG. 2, the electronic device 100 includes a memory 110 and a processor (e.g., including processing circuitry) 120.

The memory 110 may include, for example, an internal memory and/or an external memory. The internal memory may include at least one of, for example, and without limitation, a volatile memory (for example, a dynamic random access memory (DRAM), a static RAM (SRAM), a synchronous dynamic RAM (SDRAM), or the like), a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, or the like), a flash memory (for example, a NAND flash, a NOR flash, or the like), a hard drive, a solid state drive (SSD), or the like.

The external memory may include, for example, a flash drive such as, for example, and without limitation, a compact flash (CF), a secure digital (SD), a micro secure digital (Micro-SD), a mini secure digital (Mini-SD), an extreme digital (xD), a multi-media card (MMC), a memory stick, or the like.

The memory 110 may be accessed by the processor 120, and readout, writing, correction, deletion, update, and the like of data in the memory 110 may be performed under control of the processor 120.

In the disclosure, the term memory may include, for example, and without limitation, at least one of a memory provided separately from the processor 120, a ROM (not illustrated), a RAM (not illustrated) in the processor 120, or the like.

The processor 120 may include various processing circuitry and be a component for controlling an overall operation of the electronic device 100. For example, the processor 120 may drive an operating system or an application program to control a plurality of hardware or software components connected to the processor 120 and perform various kinds of data processing and calculation. The processor 120 may include various processing circuitry, such as, for example, and without limitation, a central processing unit (CPU), a graphics-processing unit (GPU) or both. The processor 120 may be implemented as, for example, and without limitation, at least one general processor, a digital signal processor, an application specific integrated circuit (ASIC), a system on chip (SoC), a microcomputer (MICOM), or the like.

The processor 120 may perform an operation of the electronic device 100 according to various example embodiments of the disclosure by executing computer executable instructions stored in the memory 110.

For example, the processor 120 may provide the response information to the user command by executing the computer executable instructions stored in the memory 110. Hereinafter, this will be described in greater detail below with reference to FIGS. 3, 4 and 5.

Figure 3:
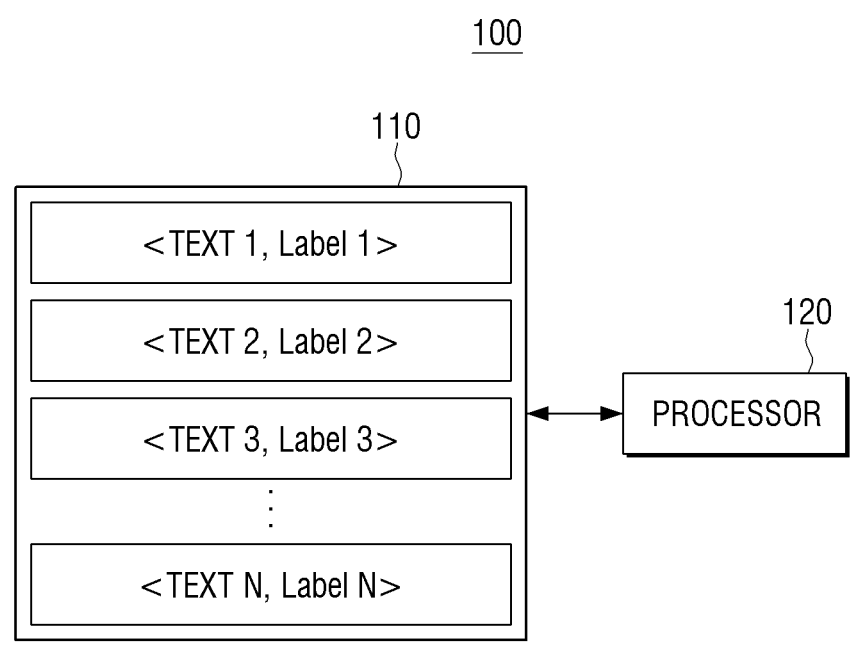
FIG. 3 is a block diagram illustrating examples of a plurality of texts previously stored in a memory according to an embodiment of the disclosure.

FIG. 3 is a block diagram illustrating examples of a plurality of texts previously stored in a memory according to an embodiment of the disclosure.

Referring to FIG. 3, the memory 110 may store a plurality of texts. For example, information on a category may be matched to each of the plurality of texts. For example, Label 1 may be matched to text 1 and Label 2 may be matched to text 2. In an example embodiment, a 'traffic' category may be matched to 'taxi search' and a 'broadcast category' may be matched to 'cooking broadcast'.

The processor 120 may receive a command, e.g., a user command. For example, the user command may be a text input through a keyboard or an on-screen keyboard of an external device (not illustrated). In addition, the user command may be user voice input through a microphone of an external device (not illustrated). In this example, the processor 120 may convert the received user voice into a text through a speech to text (STT) algorithm.

The processor 120 may identify a text corresponding to the user command among a plurality of pre-stored texts.

For example, when the processor 120 receives the user command, the processor 120 may identify the text corresponding to the user command through natural language processing technology. For example, the natural language processing may be performed using a first artificial intelligence model. For example, the processor 120 may analyze the morpheme, syntax, structure, and the like of the user command using the first artificial intelligence model, and identify, as the text corresponding to the user command, a text that matches the received user command with a preset threshold value or more among the plurality of pre-stored texts.

As an example, when the user command is "find a taxi", the processor 120 may analyze the morpheme, syntax, structure, and the like of "find a taxi" using the first artificial intelligence model, and identify, as a text corresponding to the user command, a text that matches "find a taxi" with a preset threshold value or more among the plurality of pre-stored texts. In the example embodiment described above, the text corresponding to "find a taxi" may be "taxi search".

The processor 120 may classify a category of the user command. For example, the processor 120 may classify the category of the user command using category information matched to each text.

For example, in FIG. 3, in a case in which the text 1 is 'taxi search' and Label 1 may be a 'traffic' category, when the processor 120 receives "find a taxi" as the user command, the processor 120 may classify the category of the user command as 'traffic'.

In addition, the processor 120 may provide, as response information, information corresponding to the user command among a plurality of information included in the category of the user command.

In the example embodiment described above, the processor 120 may provide, as the response information, information related to 'taxi search' among a plurality of information included in the 'traffic' category. In this example, the response information may be information related to a reservable taxi around the user. The processor 120 may receive location information from an external device (for example, a smart phone, etc.) to which the user command is input, or receive information related to a taxi from an external server that provides information on a traffic situation.

When the response information is provided using only the texts pre-stored in the memory, information that is not related to the intent of the user may be provided as the response information. For example, this is such a case when the user inputs "I want to watch a taxi" with an intent of watching a movie taxi in a state in which a text related to the movie taxi is not pre-stored in the memory.

In this example, the conventional electronic device finds "find a taxi" most similar to "I want to watch a taxi" among the pre-stored texts, and provides information related to the available taxis around the user as the response information. This is information irrelevant to the intent of the user to watch the movie taxi, which may cause inconvenience to the user.

Figure 4:
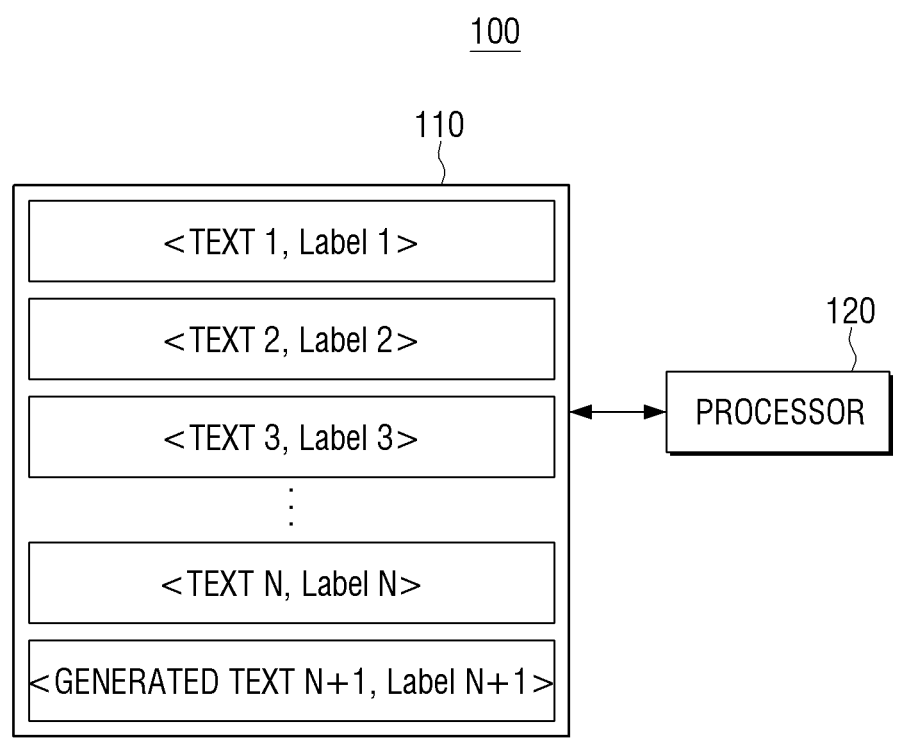
FIG. 4 is a block diagram illustrating example texts which are additionally stored according to an embodiment of the disclosure.

FIG. 4 is a block diagram illustrating examples of a text which is additionally stored according to an embodiment of the disclosure.

Referring to FIG. 4, the memory 110 may store a new text (text N+1) in addition to the plurality of pre-stored texts (text 1 to text N). For example, the new text may be a text similar in form to the plurality of pre-stored texts, but having a different entity and/or intent.

For example, the new text may be a text where one of the entity or the intent matches at least one of the plurality of pre-stored texts, but the other does not.

For example, when the pre-stored text is 'taxi search' matching the 'traffic' category, 'taxi watching' or the like that the entity matches 'taxi' but the intent is different may be the new text. In addition, when the pre-stored text is 'volume up' matching a 'volume' category, 'channel up' or the like that the intent is the same for the purpose of raising a specific value, but the entity is different may be the new text.

Meanwhile, an error category may be matched to the new text N+1. For example, the error category may be expressed by various names such as a rejection category and the like.

The processor 120 may identify a text corresponding to the user command among a plurality of pre-stored texts.

As described above, when the processor 120 receives the user command, the processor 120 may identify the text corresponding to the user command through natural language processing technology.

In addition, when the text corresponding to the user command is identified as one of the plurality of pre-stored texts (text 1 to text N), the processor 120 may provide, as response information, information corresponding to the user command among a plurality of information included in the category of the user command.

If the text corresponding to the user command is identified as one of the generated texts, the processor 120 may provide error information that information requested by the user command may not be found. That is, the processor 120 may reject the user command.

For example, when the text corresponding to the user command is identified as one of the new texts, the processor 120 may classify the category of the user command as an error based on category information matching the new text and reject the user command.

Such a new text may be generated by a second artificial intelligence model and may be classified as an error by the first artificial intelligence model.

Figure 5:
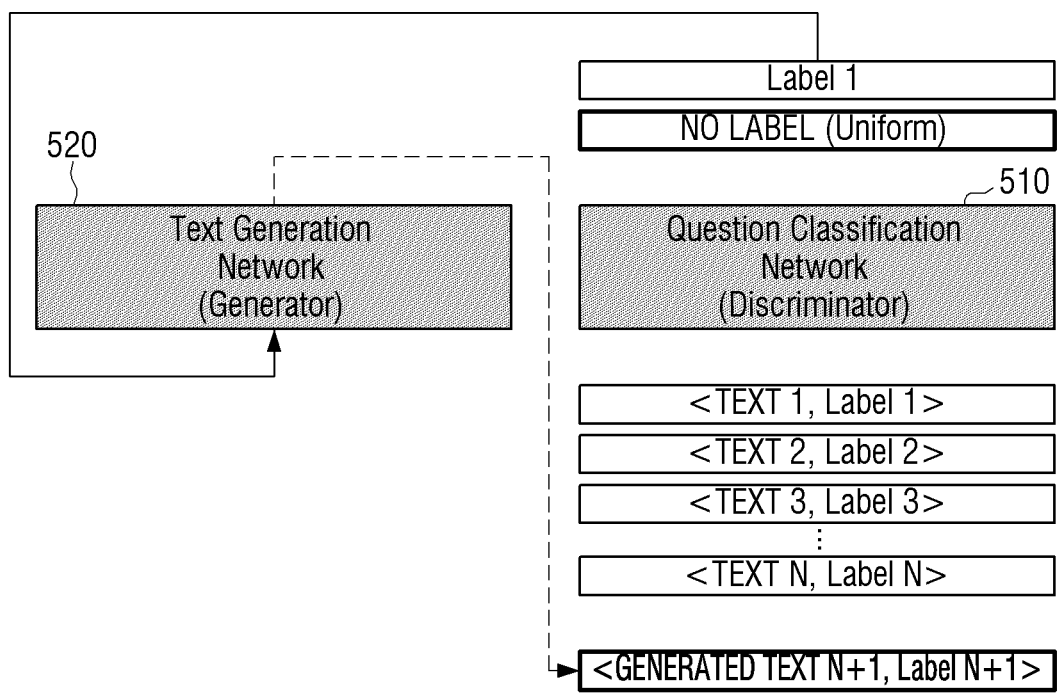
FIG. 5 is a diagram illustrating an example of learning performed by an artificial intelligence model according to an embodiment of the disclosure.

FIG. 5 is a diagram illustrating an example of learning performed by an artificial intelligence model according to an embodiment of the disclosure.

A second artificial intelligence model 520 may generate a new text which is different from the plurality of pre-stored texts. Hereinafter, for convenience of description, the new text generated by the second artificial intelligence model 520 may be referred to as a similar text.

For example, the second artificial intelligence model 520 may receive the plurality of pre-stored texts as an input and generate a text similar in form to the plurality of pre-stored texts, but having a different one of an entity and an intent.

For example, when the pre-stored text is 'taxi search' matching a 'traffic' category, the second artificial intelligence model 520 may generate, as the similar text, 'I want to watch a taxi', 'taxi watching' or the like similar in form to 'taxi search', but having a different intent. In addition, when the pre-stored text is 'volume up' matching a 'volume' category, the second artificial intelligence model 520 may generate, as the similar text, 'volume down' or the like similar in form to 'volume up', but having a different entity and intent.

The first artificial intelligence model 510 may receive the similar text generated by the second artificial intelligence model 520 as an input to determine whether the similar text is one of the plurality of pre-stored texts. In addition, if it is determined that the similar text is one of the plurality of pre-stored texts, the first artificial intelligence model 510 may learn to classify the similar text as an error.

For example, the first artificial intelligence model 510 may receive the plurality of pre-stored texts and the similar text generated by the second artificial intelligence model 520 as the input and learn to classify the similar text as the error if it is determined that the similar text is one of the plurality of pre-stored texts.

For example, in a state in which a text such as 'taxi search' is pre-stored in the 'traffic' category, but a text such as 'taxi watching' is not pre-stored, when "find a taxi" is generated as the similar text by the second artificial intelligence model, the first artificial intelligence model 510 may determine whether or not a text corresponding to "find a taxi" is one of the plurality of pre-stored texts. In addition, if the first artificial intelligence model 510 determines the pre-stored 'taxi search' as the contents corresponding to "find a taxi", which is the similar text, the first artificial intelligence model 510 may learn to classify the similar text as the error.

For example, the learning may be weight adjustment between neurons included in different layers of the first artificial intelligence model 510. For example, the first artificial intelligence model may adjust the weight between the neurons included in different layers to output a uniform distribution for the similar text generated by the second artificial intelligence model 520. For example, when N texts are pre-stored, the first artificial intelligence model 510 may adjust the weight between the neurons to output 1/N for the similar text generated by the second artificial intelligence model 520. However, it will be understood that the disclosure is not limited thereto.

For example, the first artificial intelligence model 510 may learn to output 1/N for the similar text generated by the second artificial intelligence model 520. Accordingly, the first artificial intelligence model 510 may then classify the user command as an error if the distribution for the received user command is output as 1/N.

If the first artificial intelligence model 510 classifies the similar text generated by the second artificial intelligence model 520 as the error, the first artificial intelligence model 510 may not perform the learning described above. For example, if it is determined that the similar text does not correspond to one of the plurality of pre-stored texts, the first artificial intelligence model 510 may not perform the learning described above.

In this example, the second artificial intelligence model 520 may be learned. For example, if the first artificial intelligence model 510 classifies the similar text as the error, the second artificial intelligence model 520 may learn to generate a text that is more similar to at least one of the pre-stored texts than the similar text described above.

For example, the learning may be weight adjustment between neurons included in different layers of the second artificial intelligence model 520. For example, the second artificial intelligence model may adjust the weight between the neurons included in different layers to generate the text that is more similar to at least one of the pre-stored texts than the similar text described above.

For example, when the pre-stored text is 'volume up' matching a 'volume' category, the second artificial intelligence model 520 may generate, as the similar text, 'volume down' or the like similar in form to 'volume up', but having a different entity and intent.

In addition, if the first artificial intelligence model 510 classifies 'volume down', which is the similar text as the error, the second artificial intelligence model 520 may generate a text that is more similar to 'volume up' than 'volume down' through the learning. For example, a newly generated similar text may be 'not volume up' or the like.

The first artificial intelligence model 510 may receive a new similar text having similarity higher than the similar text generated by the second artificial intelligence model 520 as an input to determine whether or not the new similar text is one of the plurality of pre-stored texts.

In addition, if the first artificial intelligence model 510 determines the new similar text as one of the plurality of pre-stored texts, the first artificial intelligence model 510 may perform the learning described above again. Similarly, if the first artificial intelligence model 510 classifies the new similar text as an error, the second artificial intelligence model 520 may perform the learning described above again.

Through such iterative learning, the first artificial intelligence model 510 may classify the similar text generated by the second artificial intelligence model 520 as the error.

The artificial intelligence model of the disclosure described above may, for example, and without limitation, include a generative adversarial network (GAN) model.

The GAN may refer, for example, to a model that generates a fake like a real through competition between two neural network models, and the second artificial intelligence model 520 may be a generator model of the GAN. For example, the second artificial intelligence model 520 may receive the plurality of pre-stored texts as an input and generate a text similar in form to the plurality of pre-stored texts, but having at least different one of an entity or an intent. In other words, the purpose of the second artificial intelligence model 520 is to generate a text similar to the plurality of pre-stored texts.

The first artificial intelligence model 510 may be a discriminator model of the GAN. For example, the first artificial intelligence model 510 may determine whether the text generated by the second artificial intelligence model 520 is one of the plurality of pre-stored texts.

In addition, the first artificial intelligence model 510 may receive the text which is determined as one of the plurality of pre-stored texts, among the texts generated by the second artificial intelligence model 520 as an input to perform the learning, and classify the text generated by the second artificial intelligence model 520 through the learning as the error.

In addition, the second artificial intelligence model 520 may receive the text which is determined that it is not one of the plurality of pre-stored texts by the first artificial intelligence model 510 among the generated similar texts as an input to perform the learning, and may generate a text having a higher similarity with the plurality of pre-stored texts than the similar text which is previously generated through the learning.

Through such iterative learning, the second artificial intelligence model 520 may generate the text having high similarity with the plurality of pre-stored texts, and the first artificial intelligence model 510 may classify the text having the high similarity with the plurality of pre-stored texts as the error.

FIGS. 6A, 6B, 7A, 7B, 8A, 8B, 9A and 9B are diagrams illustrating various examples of response information according to an embodiment of the disclosure. Hereinafter, it will be described under the assumption that the first artificial intelligence model is learned so that 'find a cooking broadcast' is pre-stored in a 'cooking' category, 'find a taxi' is pre-stored in a 'traffic' category, and 'find cooking materials' and 'I want to watching a taxi' are classified as an error.

FIGS. 6A, 6B, 7A and 7B are diagrams illustrating examples of a case in which a user voice is input to a smart TV.

Figure 6A:
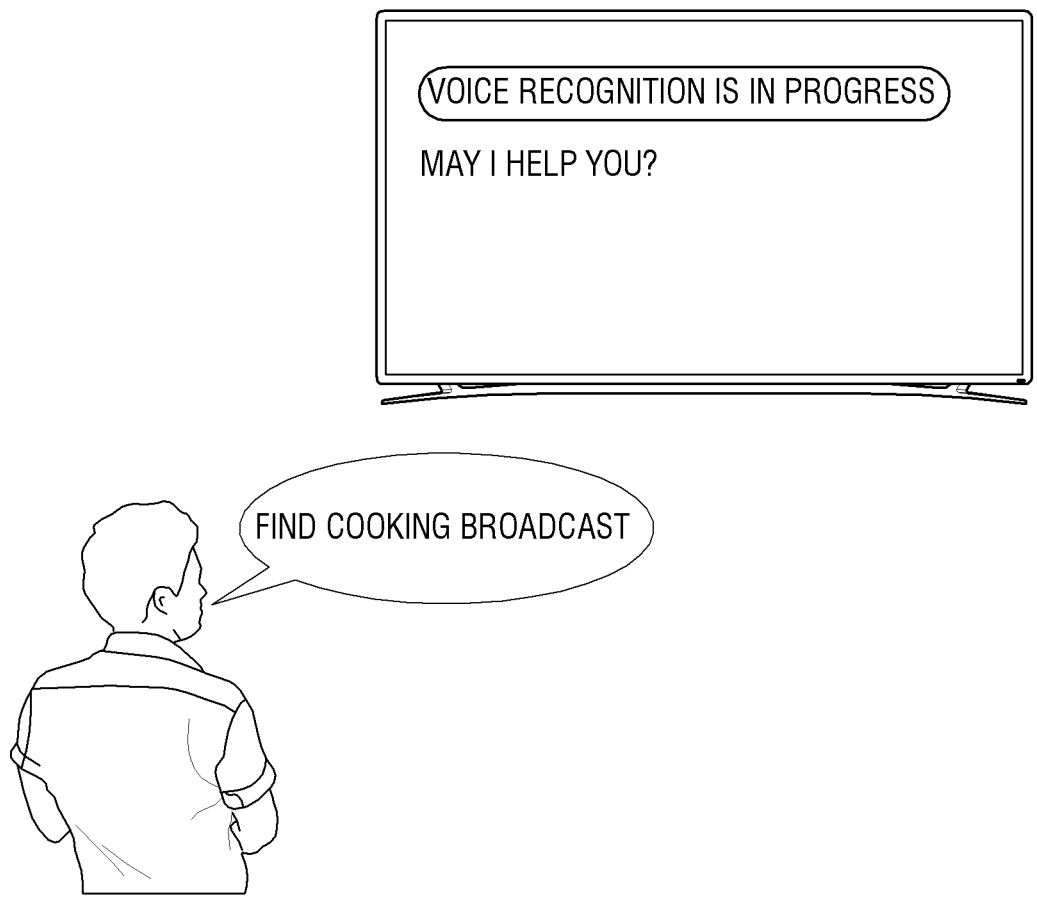
FIGS. 6A, 6B, 7A, 7B, 8A, 8B, 9A and 9B are diagrams illustrating various examples of response information according to an embodiment of the disclosure.

The electronic device 100 may receive a user command from an external device. For example, as illustrated in FIG. 6A, if the user utters "find a cooking broadcast" on a smart TV, which may, for example, be an external device, the electronic device 100 may receive a voice signal corresponding to "find a cooking broadcast" from the external device.

In addition, the electronic device 100 may, for example, convert the voice signal into a text by applying a speech to text (STT) algorithm to the voice signal.

In addition, the electronic device 100 may identify a text corresponding to the user command among a plurality of pre-stored texts. For example, the electronic device 100 may identify the text corresponding to the user command among the plurality of pre-stored texts using the first artificial intelligence model.

In addition, the electronic device 100 may provide response information on the user command based on category information matched to the identified text.

For example, as illustrated in FIG. 6A, when the user command is "find a cooking broadcast", the electronic device 100 may identify a text (for example, 'cooking broadcast' or the like) corresponding to "find a cooking broadcast" among the plurality of pre-stored texts, and provide the response information on the user command based on category information (for example, 'cooking' or the like) matched to the identified text.

Figure 6B:
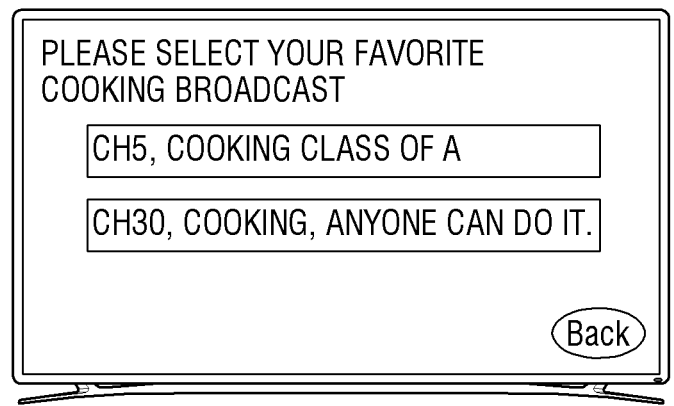

For example, in the embodiment described above, the electronic device 100 may provide, as the response information, information related to 'cooking broadcast' among a plurality of information in the 'cooking' category, as illustrated in FIG. 6B. The response information may, for example, and without limitation, be one of information previously stored in the electronic device 100, or may be web-searched information based on a keyword of the user command.

Figure 7A:
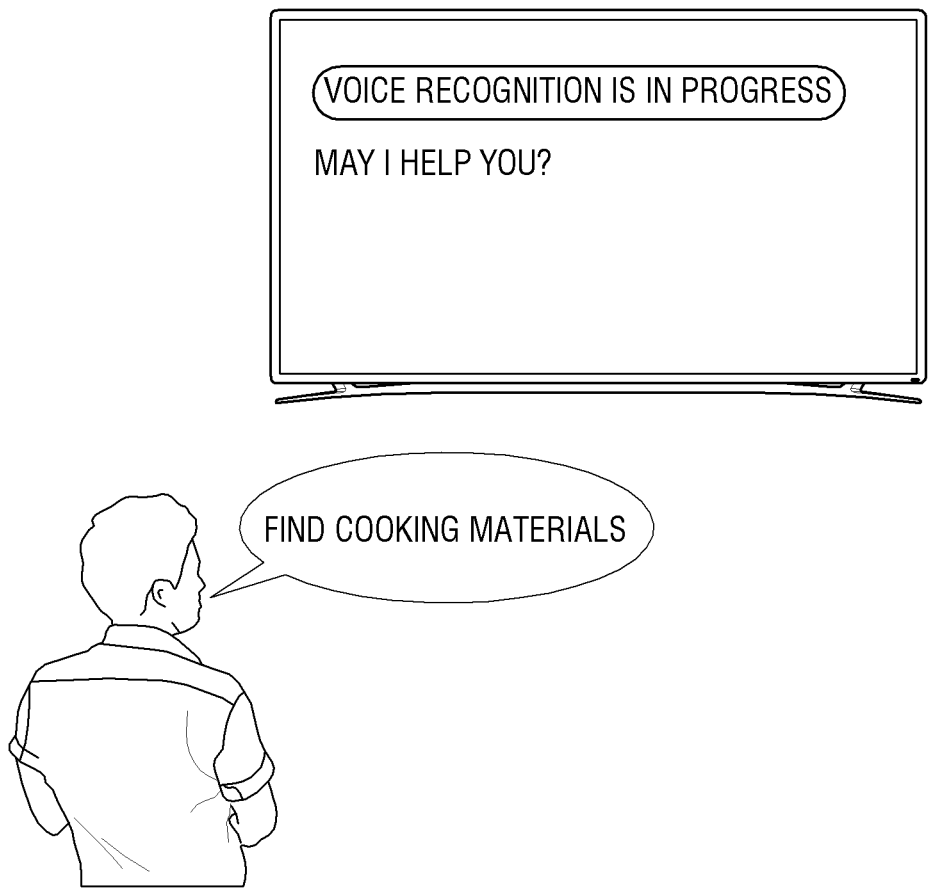

As illustrated in FIG. 7A, if the user utters "find cooking materials" on the smart TV, which is the external device in this example, the electronic device 100 may receive a voice signal corresponding to "find cooking materials" from the external device.

In addition, the electronic device 100 may identify the text corresponding to the user command among the plurality of pre-stored texts using the first artificial intelligence model.

In addition, the electronic device 100 may provide error information on the user command based on category information matched to the identified text.

For example, as illustrated in FIG. 7A, when the user command is "find cooking materials", the electronic device 100 may identify a text (for example, 'find cooking materials' or the like) corresponding to "find cooking material" among the plurality of pre-stored texts, and provide the error information on the user command based on category information (for example, 'error' or the like) matched to the identified text.

Figure 7B:
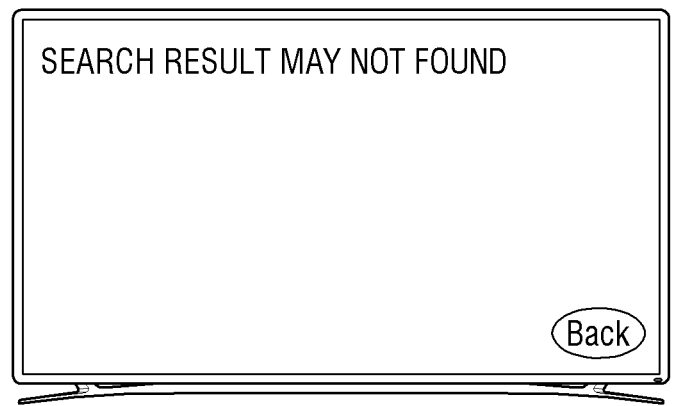

In the embodiment described above, the electronic device 100 may classify the user command as the error, and provide a message indicating that a search result for the user command may not be found as the error information, as illustrated in FIG. 7B.

FIGS. 8A, 8B, 9A and 9B are diagrams illustrating examples of a case in which a user command is input to a user terminal device.

Figure 8A:
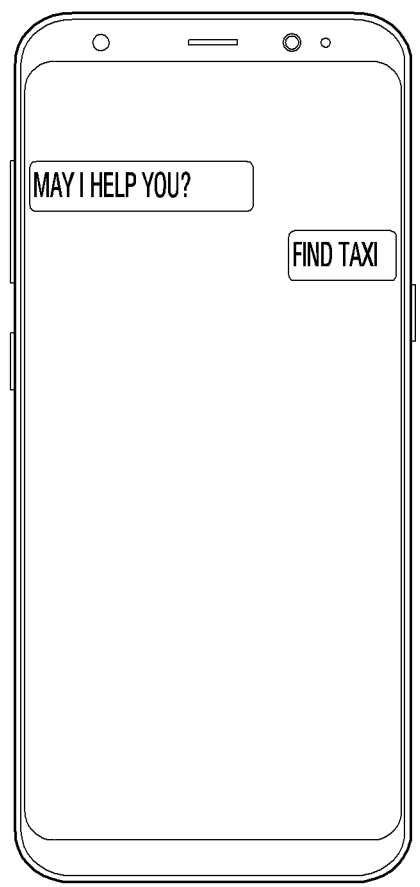

The electronic device 100 may receive a user command from an external device. For example, as illustrated in FIG. 8A, if the user inputs "find a taxi" to a user terminal device, which is an external device in this example, the electronic device 100 may receive a text such as "find taxi" from the external device. For example, a screen provided by the user terminal device may be an execution screen of a chat bot application.

In addition, the electronic device 100 may identify a text corresponding to the user command among a plurality of pre-stored texts. For example, the electronic device 100 may identify the text corresponding to the user command among the plurality of pre-stored texts using the first artificial intelligence model.

In addition, the electronic device 100 may provide response information on the user command based on category information matched to the identified text.

For example, as illustrated in FIG. 8A, when the user command is "find taxi", the electronic device 100 may identify a text (for example, 'find a taxi', 'taxi search', or the like) corresponding to "find taxi" among the plurality of pre-stored texts, and provide the response information on the user command based on category information (for example, 'traffic' or the like) matched to the identified text.

Figure 8B:
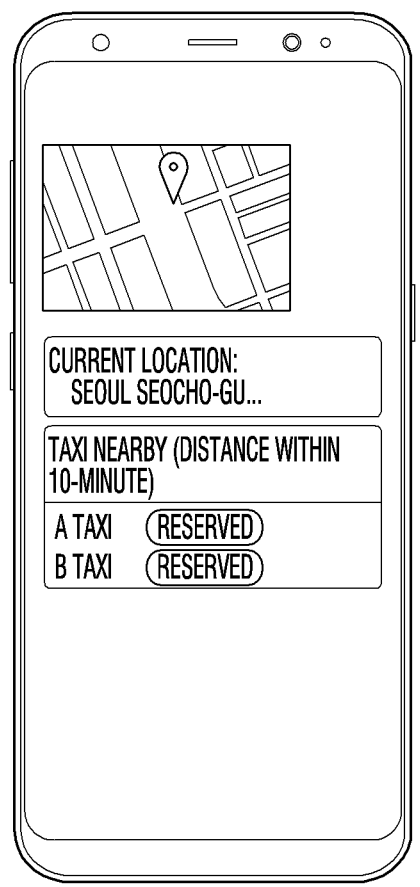

In the example embodiment described above, the electronic device 100 may provide, as the response information, information related to 'reservable taxi' among a plurality of information in the 'traffic' category, as illustrated in FIG. 8B. The electronic device 100 may receive a GPS signal from the user terminal device and/or perform communication with an external server that provides information on a traffic situation in order to search for a reservable taxi around the user.

Figure 9A:
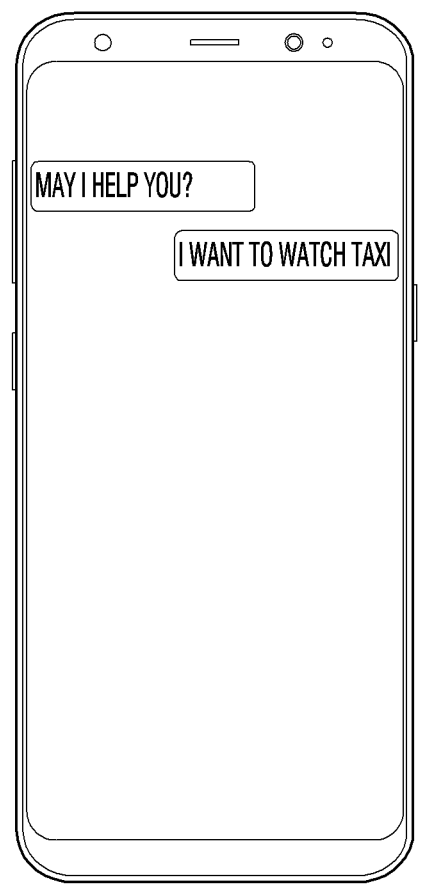

As illustrated in FIG. 9A, if the user inputs "I want to watch taxi" to the user terminal device, which is the external device in this example, the electronic device 100 may receive a text such as "I want to watch taxi" from the external device.

In addition, the electronic device 100 may identify the text corresponding to the user command among the plurality of pre-stored texts using the first artificial intelligence model.

In addition, the electronic device 100 may provide error information on the user command based on category information matched to the identified text.

For example, as illustrated in FIG. 9A, when the user command is "I want to watch taxi", the electronic device 100 may identify a text (for example, 'I want to watch a taxi' or the like) corresponding to "I want to watch taxi" among the plurality of pre-stored texts, and provide the error information on the user command based on category information (for example, 'error' or the like) matched to the identified text.

Figure 9B:
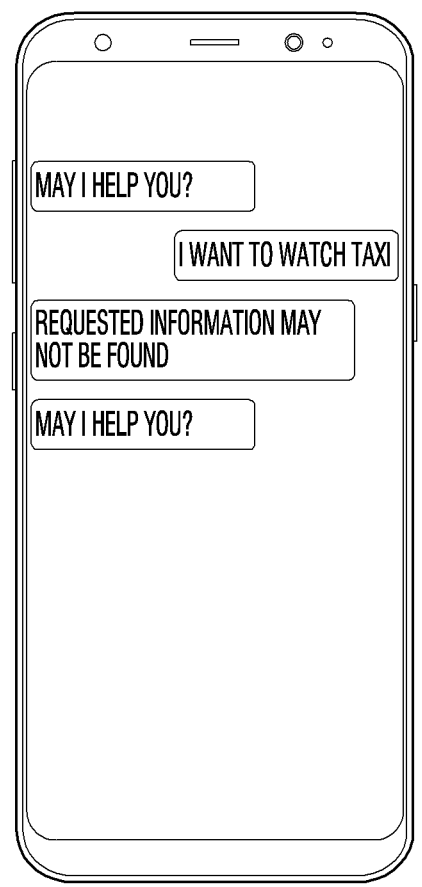

In the example embodiment described above, the electronic device 100 may classify the user command as the error, and provide, as response information, a message that induces a new user command together with a message indicating that a search result for the user command may not be found, as illustrated in FIG. 9B.

Figure 10:
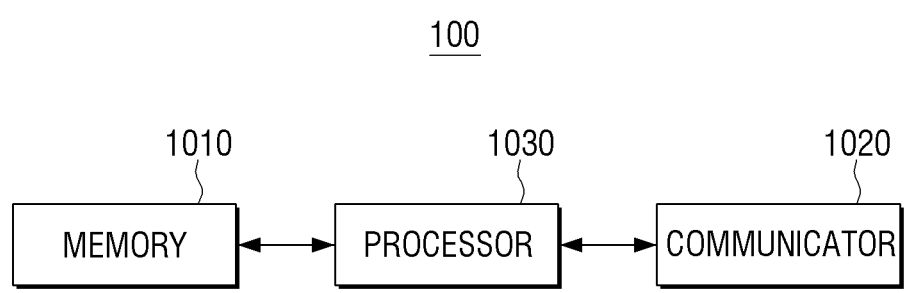
FIG. 10 is a block diagram illustrating an example configuration of an electronic device implemented as a server according to an embodiment of the disclosure.

FIG. 10 is a block diagram illustrating an electronic device implemented as a server according to an embodiment of the disclosure.

When the electronic device 100 is implemented as a server, the electronic device 100 may include a memory 1010, a communicator (e.g., including communication circuitry) 1020, and a processor (e.g., including processing circuitry) 1030, as illustrated in FIG. 10. Hereinafter, portions of the description overlapping with the above disclosure may be omitted or abbreviated.

The memory 1010 may store instructions or data related to one or more other components of the electronic device 100. In particular, the memory 1010 may be implemented as, for example, and without limitation, a non-volatile memory, a volatile memory, a flash memory, a hard disk drive (HDD), a solid state drive (SDD), or the like.

The memory 1010 may be accessed by the processor 1030, and readout, writing, correction, deletion, update, and the like of data in the memory 1010 may be performed by the processor 1030. In the disclosure, a term 'memory' includes the memory 1010, a read only memory (ROM) (not illustrated) in the processor 1030, a random access memory (RAM) (not illustrated), a memory card (not illustrated) (for example, a micro secure digital (SD) card or a memory stick) mounted in the electronic device 100, or the like, but is not limited thereto. In addition, a plurality of texts may be pre-stored in the memory 1010, and a category may be matched to each of the plurality of texts.

In addition, the memory 1010 may store a second artificial intelligence model that generates a text similar in form to the plurality of pre-stored texts, but having a different entity and/or intent, and a first artificial intelligence model that determines whether a text generated by the second artificial intelligence model is one of the plurality of pre-stored texts.

The communicator 1020 may include various communication circuitry and perform communication with the external device. In this example, the communicator 1020 may receive a user command from the external device, and transmit response information on the user command to the external device.

The communicator 1020 may include various communication circuitry implemented in a variety of forms, such as, for example, and without limitation, a wireless communication chip, a wireless fidelity (Wi-Fi) chip, a Bluetooth, or the like.

The processor 1030 may include various processing circuitry and be electrically connected to the memory 1010 and the communicator 1020 and control an overall operation and function of the electronic device 100.

The processor 1030 may receive the user command from the external device through the communicator 1020.

In addition, the processor 1030 may determine a text corresponding to the received user command, and provide the response information on the user command if the first artificial intelligence model determines that the text corresponds to one of the plurality of pre-stored texts.

For example, the processor 1030 may determine whether the text corresponding to the user command corresponds to one of the plurality of pre-stored texts, through the first artificial intelligence model. In addition, if the text is classified as one corresponding to one of the plurality of pre-stored texts, the processor 1030 may determine a category matched to the text and provide, as response information, information corresponding to the user command among a plurality of information included in the corresponding category.

For example, and without limitation, the response information may be state information such as a traffic situation, or may be control information for turning on or off power of an external device such as a TV.

In addition, if the text corresponding to the user command is classified as an error through the first artificial intelligence model, the processor 1030 may provide error information on the user command.

For example, if the text corresponding to the user command is a similar text that one of an entity and an intent is different from at least one of the plurality of pre-stored texts, the first artificial intelligence model may classify the text corresponding to the user command as the error. In this example, the processor 1030 may provide error information on the user command. For example, the error information may be information that an item requested by the user command may not be found.

Figure 11:
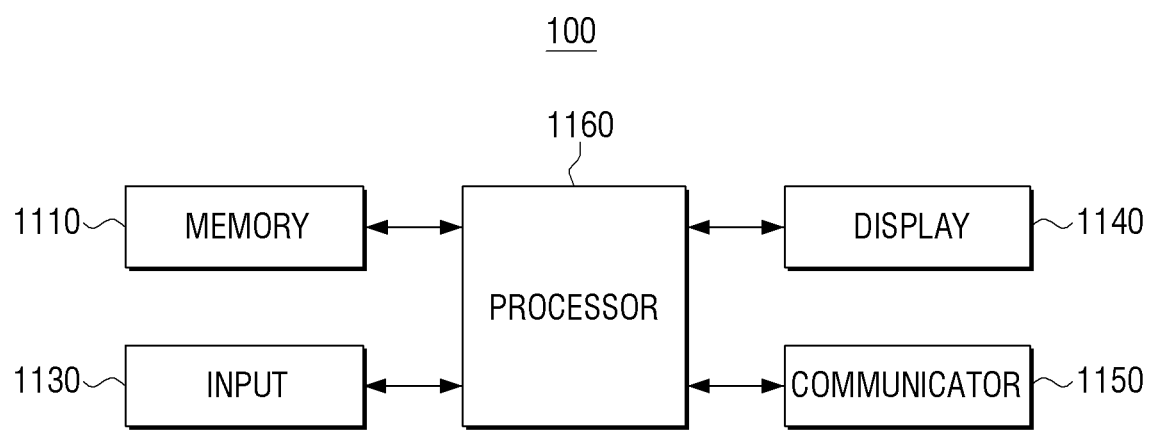
FIG. 11 is a block diagram illustrating an example configuration of an electronic device implemented as a display device according to an embodiment of the disclosure.

FIG. 11 is a block diagram illustrating an example in which the electronic device is implemented as a display device according to an embodiment of the disclosure.

The electronic device 100 may, for example, be implemented as a display device to which a user command may be input. For example, and without limitation, the electronic device 100 may be a smart phone, a PC, a tablet PC, a notebook, a PDA, a PMP, a smart TV, or the like.

As illustrated in FIG. 11, when the electronic device is implemented as the display device, the electronic device 100 may include a memory 1110, an input (e.g., including input circuitry) 1130, a display 1140, a communicator (e.g., including communication circuitry) 1150, and a processor (e.g., including processing circuitry) 1160.

The input 1130 may include various input circuitry and receive a user command.

The input 1130 may include various input circuitry, such as, for example, and without limitation, a touch sensor, a (digital) pen sensor, a pressure sensor, a key, or the like. The touch sensor may use at least one of, for example, and without limitation, a capacitive manner, a resistive manner, an infrared manner, an ultrasonic manner, or the like. The (digital) pen sensor may be, for example, a portion of a touch panel or may include a separate sheet for recognition. The key may include, for example, and without limitation, a physical button, an optical key, a keypad, or the like.

In addition, the input 1130 may include a microphone. For example, the microphone may receive a spoken voice of the user.

The display 1140 may display various screens. For example, the display 1140 may provide a screen that induces the user command. In addition, the display 1140 may display response information on the user command.

The display 1140 may be implemented by various display technologies such as, for example, and without limitation, a liquid crystal display (LCD), an organic light emitting diodes (OLED), an active-matrix organic light-emitting diode (AM-OLED), a liquid crystal on silicon (LcoS), a digital light processing (LDP), or the like. In addition, the display 1140 may also be coupled to at least one of a front region, a side region, and a rear region of the electronic device 100 in the form of a flexible display.

In addition, the display 1140 may be implemented as a touch screen including the touch sensor.

The communicator 1150 may include various communication circuitry and perform communication with the external device. For example, the communicator 1150 may receive a search result for the text corresponding to the user command through communication with an external server. In addition, when the user command is a command for controlling a specific external device, the communicator 1150 may transmit a control signal to the external device.

The processor 1160 may include various processing circuitry and receive the user command through the input 1130.

In addition, the processor 1160 may identify the text corresponding to the user command among the plurality of pre-stored texts using the first artificial intelligence model.

In addition, the processor 1160 may classify a category of the user command using the first artificial intelligence model, and provide response information on the user command.

For example, the processor 1160 may display the response information such as a traffic situation or the like through the display 1140, or may transmit a control signal for turning on or off power of an external device such as a TV to the external device.

When the electronic device 100 is implemented as the display device, some of the technologies described above may be implemented in the display device, and others may be implemented in the server.

For example, the display device may receive the user command and transmit the received user command to the server, the server may obtain or generate the response information on the received user command and transmit the response information to the display device, and the display device may display the received response information.

Figure 12:
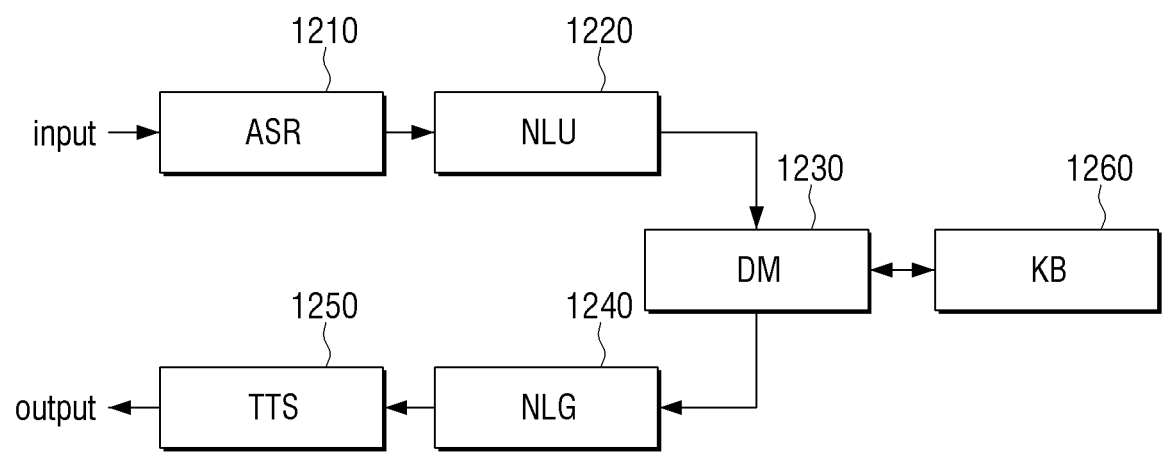
FIG. 12 is a block diagram illustrating an example dialogue system according to an embodiment of the disclosure.

FIG. 12 is a diagram illustrating an example dialogue system according to an embodiment of the disclosure.

The electronic device 100 according to an embodiment of the disclosure may store a dialogue system that provides a response to a user input (particularly, a user speech). In this example, the dialogue system may include an automatic speech recognition (ASR) (e.g., including various processing circuitry and/or executable program elements) 1210, a natural language understanding (NLU) (e.g., including various processing circuitry and/or executable program elements) 1220, a dialogue manager (DM) (e.g., including various processing circuitry and/or executable program elements) 1230, a natural language generator (NLG) (e.g., including various processing circuitry and/or executable program elements) 1240, a text-to-speech (TTS) (e.g., including various processing circuitry and/or executable program elements) 1250, and a knowledge database 1260, as illustrated in FIG. 12.

The automatic speech recognition 1210 may include various processing circuitry and/or executable program elements and perform speech recognition on a user speech input through a microphone or the like. The natural language understanding 1220 may include various processing circuitry and/or executable program elements and detect an intent of the user speech based on the speech recognition result. The dialogue manager 1230 may include various processing circuitry and/or program elements and obtain information on a response to the user speech based on the natural language understanding result and data stored in the knowledge database 1260. For example, the dialogue manager 1230 may obtain information for generating the response, and as described above, the obtained information may be determined based on an intent of the user speech detected through the natural language understanding 1220 and data stored in the knowledge database 1260. The natural language generator 1240 may include various processing circuitry and/or program elements and obtain a natural language as the response to the user speech based on the information obtained through the dialogue manager 1230. The TTS 1250 may include various processing circuitry and/or program elements and convert the obtained natural language into a speech. The dialogue system may provide the response to the user speech as a speech such that the user may perform a dialogue with the electronic device 100.

For example, the dialogue manager 1230 according to an embodiment of the disclosure may obtain response information on the user speech based on a category matched to each of the plurality of texts stored in the knowledge database 1260.

Figure 13:
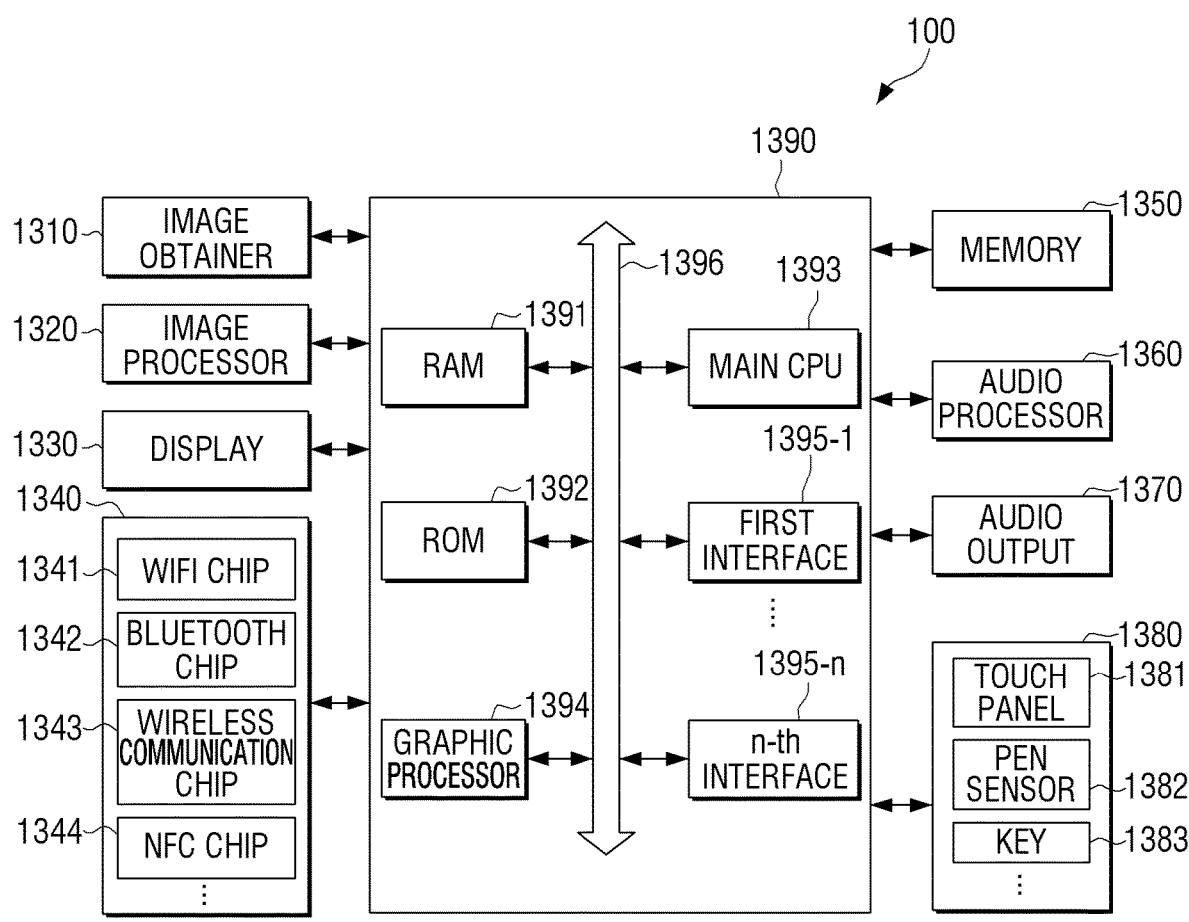
FIG. 13 is a block diagram illustrating an example electronic device according to an embodiment of the disclosure.

FIG. 13 is a block diagram illustrating an example configuration of an example electronic device according to an embodiment of the disclosure.

As illustrated in FIG. 13, the electronic device 100 may include at least one of an image obtainer (e.g., including image obtaining circuitry) 1310, an image processor (e.g., including image processing circuitry) 1320, a display 1330, a communicator (e.g., including communication circuitry) 1340, a memory 1350, an audio processor (e.g., including audio processing circuitry) 1360, an audio output (e.g., including audio output circuitry) 1370, an input (e.g., including input circuitry) 1380, and/or a processor (e.g., including processing circuitry) 1390. The components of the electronic device 100 illustrated in FIG. 13 are merely an example, and it will be understood that the electronic device 100 is not limited to the block diagram described above. Therefore, some of the components of the electronic device 100 illustrated in FIG. 13 may be omitted, modified, or added depending on a kind of electronic device 100 and/or a purpose of the electronic device 100.

The image obtainer 1310 may include various image obtaining circuitry and obtain image data through various sources. For example, the image obtainer 1310 may obtain a specific image as the response information on the user command. The image data obtained through the image obtainer 1310 may be processed by the image processor 1320.

The image processor 1320 may include various image processing circuitry and perform a processing for the image data received by the image obtainer 1310. The image processor 1320 may perform various kinds of image processing such as, for example, and without limitation, decoding, scaling, noise filtering, frame rate conversion, resolution conversion, and the like, for the image data.

The display 1330 may display the image data processed by the image processor 1320. At least a portion of the display 1330 may also be coupled to at least one of a front region, a side region, and a rear region of the electronic device 100 in the form of a flexible display. The flexible display may be bent, curved, or rolled without being damaged through a thin and flexible substrate like paper.

The display 1330 may be implemented as a touch screen having a layer structure in combination with a touch panel 1381. The touch screen may have not only a display function but also a function of detecting a touch input position, a touched area, and a touch input pressure, and may also have a function of detecting a real-touch as well as a proximity touch.

The communicator 1340 may include various communication circuitry and perform communication with various types of external devices in various types of communication manners. The communicator 1340 may include various communication circuitry implemented in various forms, including communication chips, such as, for example, and without limitation, at least one of a wireless fidelity (Wi-Fi) chip 1341, a Bluetooth chip 1342, a wireless communication chip 1343, a near field communication (NFC) chip 1344, or the like. The processor 1390 may perform communication with an external server or various external devices using the communicator 1340.

The audio processor 1360 may include various audio processing circuitry for performing processing for audio data. In the audio processor 1360, various kinds of processing such as, for example, and without limitation, decoding, amplification, noise filtering, and the like, for the audio data may be performed. The audio data processed by the audio processor 1360 may be output to the audio output 1370.

The audio output 1370 may include various audio output circuitry for outputting various alarms or speech messages as well as various audio data on which various kinds of processing such as, for example, and without limitation, decoding, amplification, noise filtering, and the like, are performed by the audio processor 1360. For example, the audio output 1370 may be implemented as a speaker, but this is only one example, and the audio output 1370 may be implemented as an output terminal that may output the audio data.

The input 1380 may include various input circuitry and receive various user inputs and transmit them to the processor 1390. The input 1380 may include, for example, and without limitation, a touch panel 1381, a (digital) pen sensor 1382, a key 1383, or the like. The touch panel 1381 may use at least one of, for example, and without limitation, a capacitive manner, a resistive manner, an infrared manner, an ultrasonic manner, or the like. In addition, the touch panel 1381 may further include a control circuit. The touch panel 1381 may further include a tactile layer to provide a tactile reaction to the user. The (digital) pen sensor 1382 may be, for example, a portion of the touch panel or may include a separate sheet for recognition. The key 1383 may include, for example, and without limitation, a physical button, an optical key, a keypad, or the like.

The processor 1390 (e.g., a controller, or the like) may include various processing circuitry and control an overall operation of the electronic device 100 using various programs stored in the memory 1350.

The processor 1390 may include, for example, a random access memory (RAM) 1391, a read only memory (ROM) 1392, a graphic processor 1393, a main central processing unit (CPU) 1394, first to n-th interfaces 1395-1 to 1395-*n*, and a bus 1396. Here, the RAM 1391, the ROM 1392, the graphic processor 1393, the main CPU 1394, the first to n-th interfaces 1395-1 to 1395-*n*, and the like, may be connected to each other through a bus 1396.

Functions related to artificial intelligence according to the disclosure may, for example, be operated through the processor 120 and the memory 110 (e.g., processing circuitry and executable program elements). The processor 120 may be configured of one or a plurality of processors. In this example, one or the plurality of processors may be generic-purpose processors such as, for example, and without limitation, a CPU, an AP, a digital signal processor (DSP), or the like, graphics dedicated processors such as, for example, and without limitation, a GPU, a vision processing unit (VPU), or the like, an artificial intelligence dedicated processor such as, for example, and without limitation, an NPU, or the like. One or a plurality of processors may control the electronic device to process input data according to a predefined operation rule or an artificial intelligence model stored in the memory. If one or a plurality of processors is an artificial intelligence dedicated processor, the artificial intelligence dedicated processor may be designed with a hardware structure specialized for processing a specific artificial intelligence model.

The predefined operating rule or the artificial intelligence model may be characterized by being made through learning. For example, making the predefined operation rule or the artificial intelligence through the learning means the predefined operation rule or the artificial intelligence model set to perform the desired characteristics (or purpose) by allowing a basic AI model to use and learn a plurality of learning data by a learning algorithm. Such learning may be made in the device itself in which the artificial intelligence according to the disclosure is performed, or may be made through a separate server and/or system. Examples of the learning algorithms include supervised learning, unsupervised learning, semi-supervised learning, or reinforcement learning, but are not limited to the above examples.

The AI model may be configured of a plurality of neural network layers. Each of the plurality of neural network layers has a plurality of weight values, and performs a neural network operation through an operation between a calculation result of a previous layer and a plurality of weights. The plurality of weights of the plurality of neural network layers may be optimized by learning results of the AI model. For example, the plurality of weights may be updated to reduce or minimize a loss value or a cost value obtained in the AI model during the learning process. The artificial neural network may a include, for example, and without limitation, deep neural network (DNN), and examples of the artificial neural network may include, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-Network, and the like, but the artificial neural network are not limited to the above examples.

Figure 14:
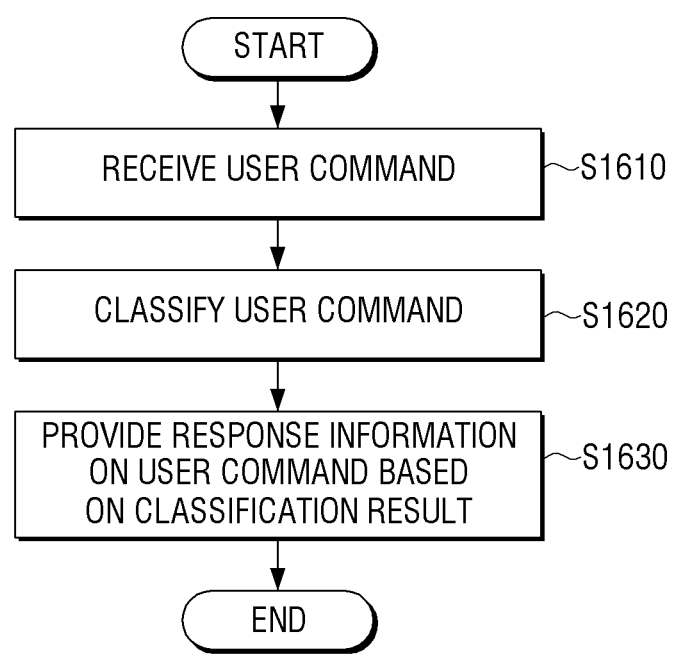
FIG. 14 is a flowchart illustrating an example operation of the electronic device according to an embodiment of the disclosure.

FIG. 14 is a flowchart illustrating an example operation of the electronic device according to an embodiment of the disclosure.

The electronic device may receive a user command (S1610). For example, the user command may be a text input through a keyboard or an on-screen keyboard, or the like, as well as a picture or a text input through a stylus or the like. In addition, the user command may also be a user speech input through a microphone.

The electronic device may classify the user command (S1620). For example, the electronic device may classify a category of the user command using a first artificial intelligence model.

When the user command is received, the electronic device 100 may first identify a text corresponding to the user command among a plurality of pre-stored texts using the first artificial intelligence model. In addition, the electronic device 100 may classify the category of the user command based on category information matched to each text.

The electronic device may provide response information on the user command based on the classification result (S1630).

For example, the electronic device may provide, as the response information, information corresponding to the user command among a plurality of information included in the category of the user command using the first artificial intelligence model.

For example, in a state in which a text such as 'taxi search' is pre-stored in the electronic device, when "find a taxi" is received, the electronic device may identity 'taxi search' by a text corresponding to "find a taxi" among the plurality of pre-stored texts. In addition, the electronic device may classify a 'traffic' category matched to 'taxi search' as the category of the user command, and provide, as the response information, information related to "taxi search" among a plurality of information included in the "traffic" category. For example, the electronic device may provide, as the response information, information related to a reservable taxi around the user.

When the category of the user command is classified as an error category, the electronic device may provide error information indicating that the information requested by the user command may not be found. That is, the electronic device may reject the user command.

Accordingly, unlike the conventional electronic device, the electronic device according to an embodiment of the disclosure may prevent and/or reduce a case of providing the response information irrelevant to the intent of the user.

The methods according to various example embodiments of the disclosure described above may be implemented by upgrading existing software/hardware of the electronic device.

In addition, the diverse embodiments of the disclosure described above may also be performed through an embedded server included in the electronic device, or an external server.

A method of controlling the electronic device according to the diverse embodiments described above may be implemented as a program and stored in various recording media. For example, a computer program which is processed by various processors and is capable of executing the above-described various controlling methods may be used in a state stored in the recording medium.

The non-transitory computer readable medium is a machine readable medium that semi-permanently stores data. For example, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although various example embodiments of the disclosure have been illustrated and described hereinabove, the disclosure is not limited to the example embodiment described above, but may be variously modified by those skilled in the art to which the disclosure pertains without departing from the scope and spirit of the disclosure as, for example, claimed in the claims. These modifications should also be understood to fall within the technical spirit and scope of the disclosure.

What is claimed is:

1. An electronic device comprising:
a memory configured to store executable instructions; and
a processor configured to execute the executable instructions to:
determine a text corresponding to a received command,
provide response information on the command based on the text being classified as a text corresponding to one of a plurality of pre-stored texts by a first artificial intelligence model, and
provide error information based on the text being classified as an error by the first artificial intelligence model,
wherein the first artificial intelligence model is configured to classify the text as the error based on the text corresponding to the command being a similar text having at least one of an entity and an intent different from at least one of the plurality of pre-stored texts;
wherein the similar text is to be generated by the processor via a second artificial intelligence model,
wherein the processor via the first artificial intelligence model is configured to determine whether the similar text input to the first artificial intelligence model corresponds to one of the plurality of pre-stored texts, and to determine whether to perform learning based on the determination result, and
wherein the processor via the second artificial intelligence model is configured to perform the learning to generate a new similar text having a higher similarity than the similar text to at least one text, based on the first artificial intelligence model determining that the similar text does not correspond to the plurality of pre-stored texts.

2. The electronic device as claimed in claim 1, wherein the first artificial intelligence model includes a model obtained by learning a model determining the text corresponding to the command based on the plurality of pre-stored texts, to classify the similar text as the error.

3. The electronic device as claimed in claim 1, wherein the first artificial intelligence model is configured to perform the learning to classify the similar text as the error based on determining that the similar text corresponds to one of the plurality of pre-stored texts, and does not perform the learning based on determining that the similar text does not correspond to the plurality of pre-stored texts.

4. The electronic device as claimed in claim 1, wherein the first artificial intelligence model is configured to receive the new similar text generated by the second artificial intelligence model, to determine whether the new similar text corresponds to one of the plurality of pre-stored texts, and to determine whether to perform the learning based on the determination result.

5. The electronic device as claimed in 1, wherein the first and second artificial intelligence models comprise generative adversarial networks (GAN).

6. A method of controlling an electronic device, the method comprising:
determining a text corresponding to a received command; and
providing response information on the command based on the text being classified as a text corresponding to one of a plurality of pre-stored texts by a first artificial intelligence model, and providing error information based on the text being classified as an error by the first artificial intelligence model,
wherein the first artificial intelligence model is configured to classify the text as the error based on the text corresponding to the command being a similar text having at least one of an entity and an intent different from at least one of the plurality of pre-stored texts,
wherein the similar text is generated by a second artificial intelligence model,
wherein the first artificial intelligence model is configured to determine whether the similar text input to the first artificial intelligence model corresponds to one of the plurality of pre-stored texts, and to determine whether to perform learning based on the determination result, and
wherein the second artificial intelligence model is configured to perform the learning to generate a new similar text having a higher similarity than the similar text to at least one text, based on the first artificial intelligence model determining that the similar text does not correspond to the plurality of pre-stored texts.

7. The method as claimed in claim 6, wherein the first artificial intelligence model comprises a model obtained by learning a model determining the text corresponding to the command based on the plurality of pre-stored texts to classify the similar text as the error.

8. The method as claimed in claim 6, wherein the first artificial intelligence model performs the learning to classify the similar text as the error based on determining that the similar text corresponds to one of the plurality of pre-stored texts, and does not perform the learning based on determining that the similar text does not correspond to the plurality of pre-stored texts.

9. The method as claimed in claim 6, wherein the first artificial intelligence model receives the new similar text generated by the second artificial intelligence model, determines whether the new similar text corresponds to one of the plurality of pre-stored texts, and determines whether to perform the learning based on the determination result.

10. The method as claimed in 6, wherein the first and second artificial intelligence models comprise generative adversarial networks (GAN).

* * * * *